Feb. 15, 1927.
S. KAHN
1,617,761
SAFETY CAR
Filed Aug. 25, 1926
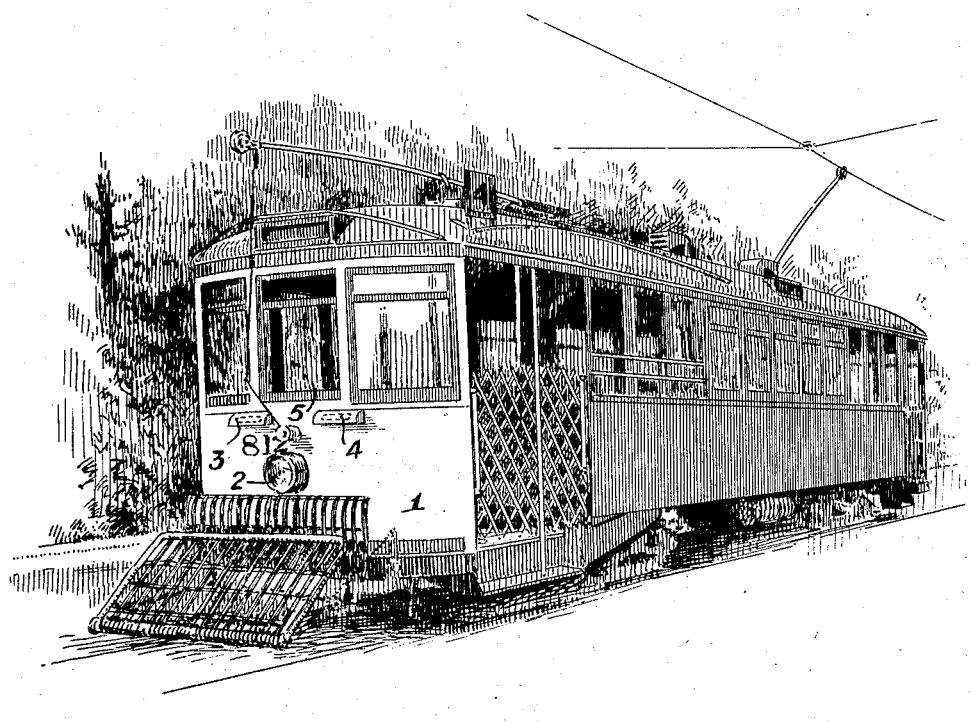

Patented Feb. 15, 1927.

1,617,761

UNITED STATES PATENT OFFICE.

SAMUEL KAHN, OF SAN FRANCISCO, CALIFORNIA, ASSIGNOR TO BYLLESBY ENGINEERING AND MANAGEMENT CORPORATION, OF CHICAGO, ILLINOIS, A CORPORATION OF DELAWARE.

SAFETY CAR.

Application filed August 25, 1926. Serial No. 131,366.

The object of my invention is to increase the safety of cars and especially their safety at night while operating on city streets. With the car of my invention anyone crossing the tracks or approaching the path of the car observes the presence of the approaching car most vividly by the large white illuminated surface approaching on the tracks and is thereby put upon his guard to avoid accidents. Moreover, the superior warning conveyed by the car of my invention results in better cooperation between the public and the car operator therefore results in superior operating conditions, the maintenance of better schedule, less nervous strain upon the operator of the car and superior results in the car operation.

The increased safety attained and superior results in car operation redound to the advantage of the entire community and especially to the saving of life and limb.

It has heretofore been the custom on cars to employ a headlight whose primary function is that of illuminating the roadway so that the driver of the car could have a clear vision of the track in front of him while retaining the car of a relatively dark or obscure color. The headlight however, does not serve as an adequate danger signal to one in front thereof, for two reasons:

Primarily, it has a blinding effect upon him and secondly, there being no opportunity for perspective in connection with such a point of approaching light, one on the track is unable to quickly and mentally estimate the distance away of the approaching car and therefore the time available for him to clear the track, the failure to quickly and mentally estimate this, often results in the car running down one who may be on the track. It is an object of my invention to avoid such accident by producing a very definite and adequate mental image on such a pedestrian who is thereby put in a position to protect himself.

It is therefore a primary object of my invention to make the approaching car itself readily distinguishable by other means than from the headlight of the car, the idea being that the safety of the pedestrian depends not only on the operator of the car observing the pedestrian and controlling the car but also upon the pedestrian getting an instantaneous, a definite and an impressive image, which will invariably result in more correct, more immediate and more complete mental processes in the pedestrian who is then better able to control his movements and clear the path. The avoidance of an accident is thus secured, by a better functioning of the person or animal in front of the car in cooperation with the operator of the car.

These objects I attain by painting one or both ends of the car white or a very light color and then by indirect illumination I illuminate the said ends of the car. The usual headlight is also provided.

By referring to the accompanying figure my invention will be made clear:

The figure represents in perspective a conventional electric car provided with conventional protective devices familiar in most municipalities, and also having my invention incorporated therein.

The car may be painted any conventional durable color well adapted to weather protection, except its front portion indicated by the numeral 1, which I paint white or a very light color.

A headlight is shown at 2, adapted to illuminate the track in front of the car.

At 3 and 4 are lamps shielded from the operator's vision at 5, but throwing light downward upon the white front 1.

The lamps 3 and 4 are also shielded from direct observation by a pedestrain on the track. By the illuminated front which looms up very clearly and impressively within his range of vision he thus sees the white front of the approaching car while the operator at 5 sees clearly the track in front of him under the illumination cast by the headlight 2.

It will thus be seen that both the pedestrian and the car operator are fully warned and put upon their guard to avoid an accident, and that by the mental image produced by the car front and its rate of enlargement the pedestrian derives a clear conception of the time and space elements which he must take into account in his movements.

While in the example adopted I have shown but one end of the car provided with my invention, it will be understood that the other end may also be so provided and I wish to be understood as claiming all such variations.

I claim:

1. A safety car having substantially white ends, illuminating means adapted to illuminate each of the said ends, a shield over said illuminating means to obscure said means from the operator of the car and from the path of the car, in combination with a headlight adapted to illuminate the path in front of the car, said headlight being shielded from illuminating the adjacent car end.

2. A safety car having a substantially white front portion in combination with a plurality of sources of illumination directed to illuminate said front and obscuring means over said sources to obscure said sources from the track in front of the car and from the car operator, and a headlight mounted on said front obscured from the front of the car and from the car operator and adapted to direct a beam of light over the path in front of the car.

SAMUEL KAHN.